US012719379B2

(12) United States Patent
Kretzschmar et al.

(10) Patent No.: US 12,719,379 B2

(45) Date of Patent: Aug. 25, 2026

(54) CONVERTER AND METHOD FOR BRINGING AN ACTUAL TRANSFORMATION RATIO INTO LINE WITH A TARGET TRANSFORMATION RATIO

(71) Applicant: Maschinenfabrik Reinhausen GmbH, Regensburg (DE)

(72) Inventors: Holger Kretzschmar, Berlin (DE); Stephan Rupp, Besigheim (DE); Axel Brandt, Hennigsdorf (DE)

(73) Assignee: REINHAUSEN GMBH, Regensburg (DE)

( * ) Notice: Subject to any disclaimer, the term of this patent is extended or adjusted under 35 U.S.C. 154(b) by 156 days.

(21) Appl. No.: 18/704,496

(22) PCT Filed: Sep. 23, 2022

(86) PCT No.: PCT/EP2022/076542

§ 371 (c)(1),
(2) Date: Apr. 25, 2024

(87) PCT Pub. No.: WO2023/072494

PCT Pub. Date: May 4, 2023

(65) Prior Publication Data

US 2024/0421715 A1 Dec. 19, 2024

(30) Foreign Application Priority Data

Oct. 26, 2021 (DE) ..................... 10 2021 127 745.0

(51) Int. Cl.
*H02M 3/335* (2006.01)
*H02M 1/00* (2007.01)

(52) U.S. Cl.
CPC ..... *H02M 3/33576* (2013.01); *H02M 1/0016* (2021.05); *H02M 3/33573* (2021.05)

(58) Field of Classification Search
CPC ............. H02M 1/0016; H02M 1/0025; H02M 3/33584; H02M 3/33576; H02M 3/33592; H02M 3/01; H02M 3/33573
See application file for complete search history.

(56) References Cited

U.S. PATENT DOCUMENTS

2008/0192511 A1 8/2008 Hansson et al.
2013/0201725 A1 8/2013 Boysen et al.
(Continued)

FOREIGN PATENT DOCUMENTS

CN 110677026 A 1/2020
DE 60306360 T2 5/2007
(Continued)

OTHER PUBLICATIONS

"Vorsteuerung", last edited Aug. 9, 2020, Retrieved from Wikipedia (URL: https://de.wikipedia.org/w/index.php?title=Vorsteuerung&oldid=202637460).

*Primary Examiner* — Ryan Johnson
(74) *Attorney, Agent, or Firm* — LEYDIG , VOIT & MAYER, LTD.

(57) ABSTRACT

A converter converts a DC input voltage into a DC output voltage. The converter includes: a regulator unit coupled to a power unit. The power unit has: a first converter stage, with two input connections; a second converter stage, which is connected to the first converter stage; and a third converter stage, which is connected to the second converter stages and has two output connections. The first, second, and third converter stages are adapted so that, when the DC input voltage is applied, the DC output voltage is supplied during operation of the converter. An actual transformation ratio of the power unit is defined: by a ratio between the DC input voltage and the DC output voltage, or by a ratio between an input current and an output current. The regulator unit acts
(Continued)

on the power unit such that the actual transformation ratio is matched to a predetermined transformation ratio.

17 Claims, 4 Drawing Sheets

(56) References Cited

U.S. PATENT DOCUMENTS

| | | | | |
|---|---|---|---|---|
| 2016/0352236 | A1 | 12/2016 | Yoo et al. | |
| 2019/0068069 | A1* | 2/2019 | Sheng | H02M 3/01 |
| 2020/0313443 | A1 | 10/2020 | Elmenshawy et al. | |
| 2024/0042896 | A1* | 2/2024 | Otten | B60L 58/20 |

FOREIGN PATENT DOCUMENTS

| | | | |
|---|---|---|---|
| JP | 2014143884 | A | 8/2014 |
| JP | 2016152687 | A | 8/2016 |
| WO | 2019130395 | A1 | 7/2019 |

* cited by examiner 5
3
37
35
37
41
33
39
43
51
53
49
45
47

CONVERTER AND METHOD FOR BRINGING AN ACTUAL TRANSFORMATION RATIO INTO LINE WITH A TARGET TRANSFORMATION RATIO

CROSS REFERENCE TO RELATED APPLICATIONS

This application is a U.S. National Phase application under 35 U.S.C. § 371 of International Application No. PCT/EP2022/076542, filed on Sep. 23, 2022, and claims benefit to German Patent Application No. DE 10 2021 127 745.0, filed on Oct. 26, 2021. The International Application was published in German on May 4, 2023 as WO 2023/072494 A1 under PCT Article 21(2).

FIELD

The present disclosure relates to a converter for converting a DC input voltage into a DC output voltage having a power unit and a regulator unit which is coupled to the power unit, and to a method for converting a DC input voltage into a DC output voltage.

BACKGROUND

Converters may have a power unit and a regulator unit, which is coupled to the power unit. For example, DC input voltages can be applied to the power unit, these being able to be converted into DC output voltages using switching elements of the power unit. For the conversion of a DC input voltage into a DC output voltage, the switching elements are usually switched in a manner coordinated with one another, wherein each of the switching elements can respectively assume an electrically conductive state and an electrically insulating state. Furthermore, for example, converters may have a power unit to which AC input voltages can be applied, these being able to be converted into AC output voltages by means of switching elements of the power unit. Here, too, for the conversion of an AC input voltage into an AC output voltage, the switching elements are usually switched in a manner coordinated with one another, wherein each of the switching elements can respectively assume an electrically conductive state and an electrically insulating state here too.

Converters which can convert AC input voltages into AC output voltages and can also be referred to as AC/AC converters are used, for example, in so-called AC networks to connect different voltage levels to one another or to provide same, these also being referred to as AC voltage levels, such as, for example, an extra-high-voltage level to a high-voltage level, a high-voltage level to a medium-voltage level, or a medium-voltage level to a low-voltage level. The converters which can convert DC input voltages into DC output voltages and can also be referred to as DC/DC converters are also used to connect different voltage levels to one another or to provide same, these also being referred to as DC voltage levels. DC/DC converters are usually operated as a current source or as a voltage source.

When the DC/DC converter is operated as a current source, the DC input voltage is regulated, that is to say kept constant, and the converter forms a current source at the output or on the secondary side. When the DC/DC converter is operated as a voltage source, the DC output voltage is regulated, that is to say kept constant, and the converter forms a voltage source at the output or on the secondary side. When the converter is operated as a current source or as a voltage source, the power supplied to or drawn from the primary side, that is to say at the input, depending on the load flow direction is drawn from or supplied to the secondary side. In particular, regulation-related models for regulating DC/DC converters can be designed for the converter as a current source or as a voltage source. Voltage-source networks are often required for DC/DC converters, which limits the flexibility of the possible applications of DC/DC converters. In addition, the voltage-source operation of a DC/DC converter, that is to say when it provides a voltage source on the secondary side, can result in complex regulation of the converter.

SUMMARY

In an embodiment, the present disclosure provides a converter that converts a DC input voltage into a DC output voltage. The converter includes: a power unit; and a regulator unit coupled to the power unit. The power unit has: a first converter stage comprising two input connections; a second converter stage, which is connected to the first converter stage; and a third converter stage, which is connected to the second converter stage and has two output connections. The first converter stage, the second converter stage, and the third converter stage are adapted so that, when the DC input voltage is applied to the two input connections, the DC output voltage is supplied at the two output connections during operation of the converter. An actual transformation ratio of the power unit is defined: by a ratio between the DC input voltage, which is applied to the two input connections, and the DC output voltage, which is applied to the two output connections, or by a ratio between an input current, which is present at the two input connections, and an output current, which is present at the two output connections. The regulator unit is adapted to act on the power unit in such a way that the actual transformation ratio is matched to a predetermined target transformation ratio.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
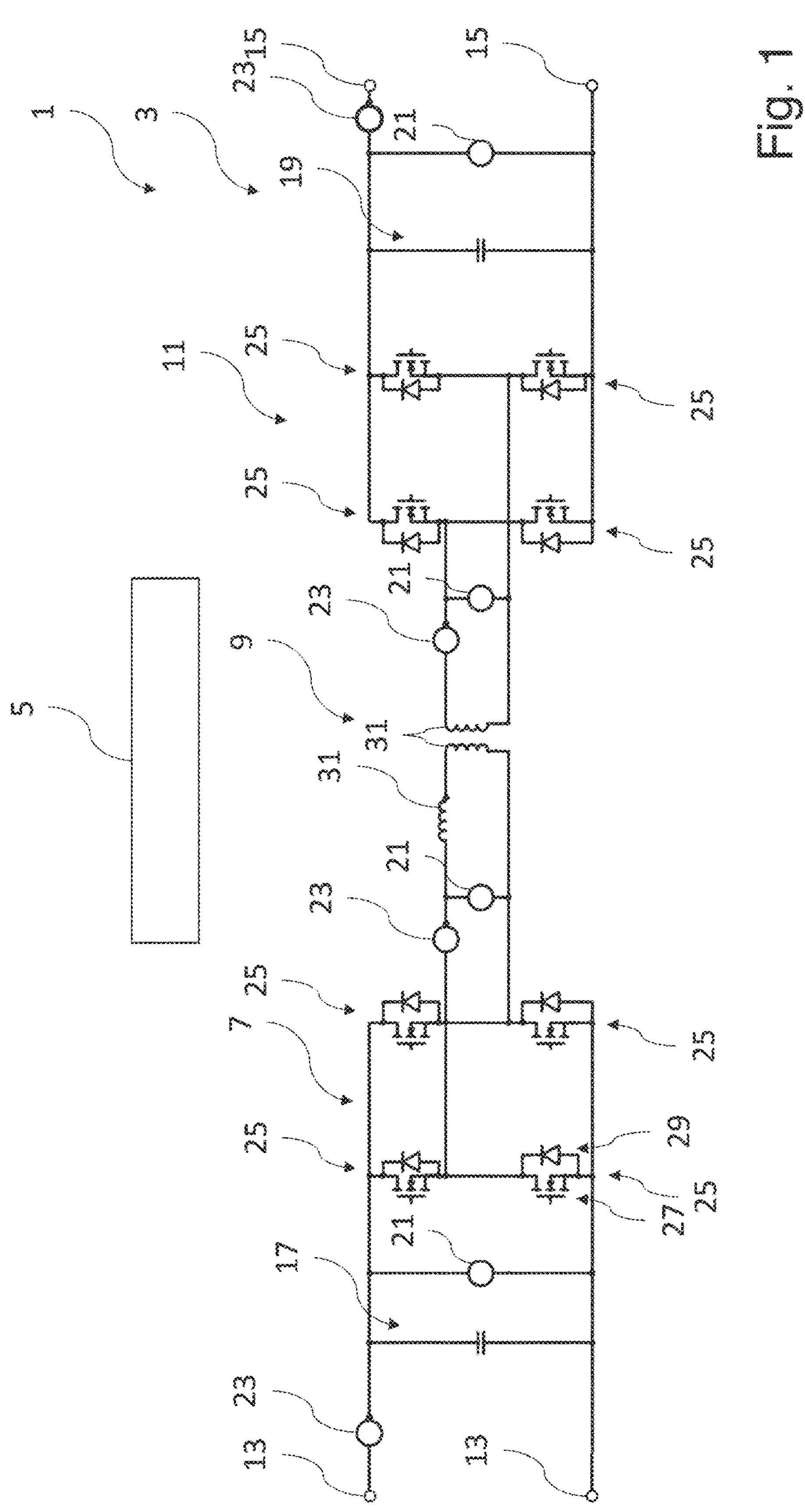
FIG. 1 shows a schematic view of one embodiment of a converter according to aspects of the present disclosure having a power unit and a regulator unit.

The present inventors have recognized that, in general, it is desirable to provide DC/DC converters that involve low-complexity regulation and are flexible in use.

Therefore, aspects of the present disclosure provide DC/DC converters that involve low-complexity regulation and are flexible in use.

According to a first aspect of the present disclosure, a converter is provided for converting a DC input voltage into a DC output voltage. The converter comprises a power unit. The power unit comprises a first converter stage. The first converter stage comprises two input connections. The power unit comprises a second converter stage which is connected to the first converter stage. The power unit also comprises a third converter stage which is connected to the second converter stage. The third converter stage comprises two output connections. The first converter stage, the second converter stage and the third converter stage are adapted so that, when the DC input voltage is applied to the two input connections, the DC output voltage is supplied at the two output connections during operation of the converter. An actual transformation ratio of the power unit is defined by a ratio between the DC input voltage which is applied to the two input connections and the DC output voltage which is applied to the two output connections or by a ratio between the input current which is present at the two input connections and the output current which is present at the two output connections. In addition, the converter comprises a regulator unit which is coupled to the power unit. The regulator unit is adapted to act on the power unit in such a way that the actual transformation ratio is matched to a predetermined target transformation ratio.

The converter is designed for converting a DC input voltage into a DC output voltage. Both the DC input voltage and the DC output voltage are preferably electrical DC voltages for which the instantaneous value does not change over a longer observation period, or only slightly changes within a predetermined DC voltage interval, which extends from a minimum DC voltage value to a maximum DC voltage value. In the event that the instantaneous value changes over time, neither the DC input voltage nor the DC output voltage changes its polarity.

The converter comprises the power unit. The power unit comprises the first converter stage, the second converter stage which is connected to the first converter stage, and the third converter stage, which is connected to the second converter stage. The first converter stage, the second converter stage and the third converter stage each form a section of the converter.

In a particular embodiment, the first converter stage, the second converter stage and the third converter stage each comprise electronic components which are connected to one other in such a way that each converter stage can convert a corresponding converter stage input voltage, which is applied to corresponding input connections, into a corresponding converter stage output voltage, which is applied to corresponding output connections.

In a particular embodiment, each converter stage can convert a corresponding converter stage input voltage into a corresponding converter stage output voltage so that the converter converts the DC input voltage into the DC output voltage.

In a particular embodiment, the DC input voltage corresponds to the converter stage input voltage of the first converter stage and the DC output voltage corresponds to the converter stage output voltage of the third converter stage.

In a particular embodiment, the converter stage output voltage of the first converter stage, the converter stage input voltage of the second converter stage, the converter stage output voltage of the second converter stage and the converter stage input voltage of the third converter stage may each be an AC voltage.

When the present disclosure refers to an AC voltage, the instantaneous value of the AC voltage preferably changes over a longer observation period. The instantaneous value of the AC voltage preferably changes periodically. In particular, the instantaneous value of the AC voltage changes over time with the result that the AC voltage changes its polarity repeatedly over time.

The converter according to aspects of the present disclosure can be operated, in particular, in a bidirectional manner, that is to say independently of the load flow direction, so that the terms DC input voltage and DC output voltage as well as converter stage input voltage and converter stage output voltage are not to be understood as restrictive and describes the corresponding voltages for an operating state of the converter during energy transfer from the two input connections to the two output connections. For an operating state of the converter during energy transfer from the two output connections to the two input connections, the designation of the corresponding voltages, and in particular also of the connections, such as input connection and output connection, for example, would have to be reversed.

The first converter stage comprises the two input connections. The third converter stage comprises the two output connections. In particular, the two input connections and the two output connections each provide electrical contact. The two input connections can be connected to a voltage source so that an electrical connection is established between the voltage source and the two input connections so that the DC input voltage is applied to the two input connections. The two output connections can be connected to an electrical load so that an electrical connection is established between the electrical load and the two output connections so that an electric current can flow through the electrical load.

In a particular embodiment, both the two input connections can be connected to a first component of a DC network and the two output connections can be connected to a second component of a DC network, wherein the first component is assigned to a first DC voltage level and the second component is assigned to a second DC voltage level.

If two input connections are mentioned in connection with the present disclosure without explicitly referring to the fact that the two input connections are assigned to a different converter stage than the first converter stage, the two input connections means the two input connections of the first converter stage. If two output connections are mentioned in connection with the present disclosure without explicitly referring to the fact that the two output connections are assigned to a different converter stage than the third converter stage, the two output connections means the two output connections of the third converter stage.

The first converter stage, the second converter stage, and the third converter stage are adapted so that, when the DC input voltage is applied to the two input connections, the DC output voltage is supplied at the two output connections during operation of the converter. The first converter stage, the second converter stage, and the third converter stage can each have one switching element or a plurality of switching elements.

In a particular embodiment, both the first converter stage and the third converter stage each have a plurality of switching elements, in particular four switching elements each. Each switching element of the switching elements may have a transistor. The transistor is preferably an insulated-gate field-effect transistor (IGFET) or, particularly preferably, a metal-oxide-semiconductor field-effect transistor (MOSFET) or, more preferably, an insulated-gate bipolar transistor (IGBT). Each transistor may be designed, for example, as an enhancement type or depletion type and have an n-channel or p-channel. Each switching element of the switching elements may have a diode. Each switching element of the switching elements has, in particular, a first connection and a second connection. The transistor of each switching element is preferably connected to both the first connection and the second connection. In addition, the diode of each switching element is preferably connected to both the first connection and the second connection.

In a particular embodiment, the transistor and the diode are interconnected in parallel with one another between the first connection and the second connection.

In a particular embodiment, each switching element of the switching elements can assume an electrically conductive state and an electrically insulating state. When a switching element is in the electrically conductive state, an electric current can flow through the corresponding switching element. When the corresponding switching element is in the electrically insulating state, the electric current cannot flow through the corresponding switching element. A corresponding switching operation can be used to switch between the electrically conductive state and the electrically insulating state of each switching element.

The switching elements of the first converter stage are preferably connected to one other in such a way that they form a full-bridge arrangement. In this case, two switching elements of the first converter stage are connected to a first input connection of the two input connections. A first switching element of these two switching elements is preferably connected to a first output connection of the first converter stage and a second switching element of these two switching elements is preferably connected to a second output connection of the first converter stage. Two further switching elements of the first converter stage are preferably connected to a second input connection of the two input connections. A third switching element of these two switching elements is preferably connected to the first output connection of the first converter stage and a fourth switching element of these two switching elements is preferably connected to the second output connection of the first converter stage.

The switching elements of the third converter stage are preferably connected to one other in such a way that they form a full-bridge arrangement. Two switching elements of the third converter stage are preferably connected to a first output connection. A first switching element of these two switching elements is preferably connected to a first input connection of the third converter stage and a second switching element of these two switching elements is preferably connected to a second input connection of the third converter stage. Two further switching elements of the third converter stage are preferably connected to a second output connection. A third switching element of these two switching elements is preferably connected to the first input connection of the third converter stage and a fourth switching element of these two switching elements is preferably connected to the second input connection of the third converter stage.

In a particular embodiment, the second converter stage may have an inductor or a plurality of inductors. The second converter stage preferably has two inductors, which form a transformer. The transformer can form a mid-frequency transformer. By means of the transformer, the second converter stage can provide DC isolation, in particular between the first converter stage and the third converter stage. The two inductors of the transformer may have windings which are arranged in such a way that the windings are in the same or opposite direction. The transformer may therefore have two windings with the same or opposite phase position. The second converter stage may additionally have a further inductor and a capacitance which is connected in series or parallel with the inductors, these together forming a resonant circuit. The resonant circuit can be used to ensure that that the instantaneous value of the electric current during the transition from the electrically conductive state to the electrically insulating state of one or more switching elements is particularly low so that the power loss of the one or more switching elements is particularly low, with the result that the efficiency of the converter may be particularly high.

Furthermore, the actual transformation ratio of the power unit may be defined by the ratio between the DC input voltage, which is applied to the two input connections, and the DC output voltage, which is applied to the two output connections; or may be defined by the ratio between the input current, which is present at the two input connections, and the output current which is present at the two output connections.

The converter preferably has a plurality of detection units. The plurality of detection units preferably has at least one first detection unit which is adapted for detecting an electrical voltage. Furthermore, the plurality of detection units preferably has at least one second detection unit which is adapted for detecting an electric current. A first detection unit is preferably connected to the two input connections. A further first detection unit is more preferably connected to the two output connections. More preferably, a further first detection unit is connected to two output connections of the first converter stage and to two input connections of the second converter stage. A further first detection unit is preferably connected to two output connections of the second converter stage and to two input connections of the third converter stage. A second detection unit is preferably connected to an input connection of the two input connections. A further second detection unit is preferably connected to an output connection of the two output connections. A further second detection unit is preferably connected to an output connection of the output connections of the first converter stage and to an input connection of the input connections of the second converter stage. A further second detection unit is preferably connected to an output connection of the output connections of the second converter stage and to an input connection of the input connections of the third converter stage. The first detection unit which is connected to the two input connections can be used to detect the DC input voltage which is applied to the two input connections. The second detection unit which is connected to one of the two input connections can be used to detect an input current which is present at the two input connections. In connection with the present disclosure, the fact that the input current is present at the two input connections means, in particular, that the input current is present at least at the input connection to which the second detection unit is connected. The first detection unit which is connected to the two output connections can be used to detect the DC output voltage which is applied to the two output connections. The second detection unit which is connected to one of the two output connections can be used to detect an output current which is present at the two output connections. In connection with the present disclosure, the fact that the output current is present at the two output connections means, in particular, that the output current is present at least at the output connection to which the second detection unit is connected.

An essential idea behind aspects of the present disclosure is that a transformation ratio is defined. The transformation ratio can be defined based on the DC input voltage, which is applied to the two input connections, and the DC output voltage, which is applied to the two output connections. Alternatively, the transformation ratio can be defined based on the input current, which is present at the two input connections, and the output current, which is present at the two output connections. Provision is made, in particular, for either a ratio between the DC input voltage, which is applied to the two input connections, and the DC output voltage, which is applied to the two output connections, or a ratio between the input current, which is present at the two input connections, and the output current, which is present at the two output connections to be defined. In particular, the DC input voltage and DC output voltage, which are detected by means of the first detection units, defines the actual transformation ratio, which is provided at a point in time by the power unit. Alternatively, the actual transformation ratio, which is provided at a point in time by the power unit may be defined by the input current and output current, which is detected by means of the second detection units. In particular, the actual transformation ratio corresponds either to the quotient of the DC input voltage (dividend) and the DC output voltage (divisor) or to the quotient of the output current (dividend) and the input current (divisor).

In addition, the converter comprises the regulator unit which is coupled to the power unit. In a particular embodiment, the regulator unit is connected to the switching elements in order to actuate the switching elements. In a particular embodiment, the regulator unit can provide a corresponding control signal for each switching element so that each switching element of the switching elements can pass both from a corresponding electrically conductive state to a corresponding electrically insulating state as well as from the corresponding electrically insulating state to the corresponding electrically conductive state depending on the corresponding control signal. Furthermore, the regulator unit may be connected, in particular, to the first detection units and to the second detection units. The regulator unit can receive a corresponding detection signal from each first detection unit of the first detection units, said detection signal corresponding to an actual value of an applied electrical voltage. Furthermore, the regulator unit can receive a corresponding detection signal from each second detection unit of the second detection units, said detection signal corresponding to an actual value of a present electric current. The regulator unit can therefore determine the actual transformation ratio using detection signals.

The regulator unit is adapted to act on the power unit in such a way that the actual transformation ratio is matched to the predetermined target transformation ratio.

In a particular embodiment, the regulator unit can act on the power unit by actuating the switching elements. In a particular embodiment, the transformation ratio that is to be targeted by the actual transformation ratio is referred to as the target transformation ratio. The target transformation ratio may be constant over time, in particular during a specified period of time, or it may be variable over time, in particular, during a specified period of time.

The actual transformation ratio is preferably matched to the predetermined target transformation ratio for certain ranges of electrical voltages and/or for certain ranges of electric currents. For example, it is possible to define a minimum electrical voltage and a maximum electrical voltage for the first converter stage, with the DC input voltage having to be between these, so that the regulator unit acts on the power unit in such a way that the actual transformation ratio is matched to the predetermined target transformation ratio. Furthermore, for example, it is possible to define a minimum electric current and a maximum electric current for the first converter stage, with the input current having to be between these, so that the regulator unit acts on the power unit in such a way that the actual transformation ratio is matched to the predetermined target transformation ratio. In addition, for example, it is possible to define a minimum electrical voltage and a maximum electrical voltage for the third converter stage, with the DC output voltage having to be between these, so that the regulator unit acts on the power unit in such a way that the actual transformation ratio is matched to the predetermined target transformation ratio. For example, it is also possible to define a minimum electric current and a maximum electric current for the third converter stage, with the output current having to be between these, so that the regulator unit acts on the power unit in such a way that the actual transformation ratio is matched to the predetermined target transformation ratio. The fact that the actual transformation ratio is matched to the predetermined target transformation ratio for certain ranges of electrical voltages and/or certain ranges of electric currents makes it possible to ensure that the converter can be operated reliably.

It can be stated that, in the case of the converter according to the present disclosure, the actual transformation ratio is matched to the predetermined target transformation ratio, thereby avoiding the converter having to be operated as a current source or as a voltage source as known from the prior art. Voltage-source networks are not required for the converter according to the present disclosure. In addition, no complex regulation is necessary for the converter according to the present disclosure, since the converter according to the present disclosure does not provide a voltage source on the secondary side. The converter according to the present disclosure involves low-complexity regulation and is flexible in use. The low-complexity regulation is due, in particular, to the fact that the actual transformation ratio and the target transformation ratio are defined and the actual transformation ratio is rarely matched to the target transformation ratio. The converter according to the present disclosure is flexible in use due, in particular, to the fact that the converter does not have to be operated either as a current source or as a voltage source and the converter is thus not influenced in terms of its configuration and regulation to the extent known from the prior art by the components that interact directly with the converter, such as components of a network, for example.

In one embodiment, the predetermined target transformation ratio is constant over time. A target transformation ratio which is constant over time ensures that the converter according to the present disclosure can be operated in a DC network similar to a transformer in an AC network with a constant transformation ratio.

In one embodiment, the predetermined target transformation ratio is variable over time. A target transformation ratio which is variable over time ensures that the converter according to the present disclosure can be operated in a DC network similar to a transformer in an AC network with a variable transformation ratio. In the case of a target transformation ratio which is variable over time, the target transformation ratio, in particular in the short term, can be adjusted to external conditions such as, for example, changing electrical voltages which are applied to the input connections or output connections or changing electric currents which are present at the input connections or output connections.

In one embodiment, the first converter stage comprises an electronic circuit of an inverter. As already described, the converter according to the present disclosure can be operated, in particular, bidirectionally, and so the term inverter is not to be understood restrictively and it only performs the function of an inverter for energy transmission from the input connections to the output connections. When energy is transmitted from the output connections to the input connections, the electronic circuit of the first converter stage performs the function of a rectifier. If the first converter stage comprises the electronic circuit of the inverter, an electronic circuit of particularly simple design is provided.

In one embodiment, the second converter stage is adapted to provide DC isolation. When the second converter stage is adapted to provide DC isolation, this is particularly advantageous when the input connections are connected to a first network section and the output connections are connected to a second network section, since the second converter stage ensures that the first network section and the second network section are DC-isolated from one other. The converter according to the present disclosure thus ensures the function of DC isolation, similar to that of conventional transformers in an AC network.

In one embodiment, the second converter stage comprises a transformer. When the second converter stage comprises the transformer, an electronic circuit of particularly simple design is provided for the second converter stage.

In one embodiment, the second converter stage comprises an electronic circuit of a converter element. When the second converter stage comprises the electronic circuit of the converter element, an electronic circuit of particularly simple design is provided as an alternative to the transformer.

In one embodiment, the third converter stage comprises an electronic circuit of a rectifier. As already described, the converter according to the present disclosure can be operated, in particular, bidirectionally, and so the term rectifier is not to be understood restrictively and it actually only performs the function of a rectifier for energy transmission from the input connections to the output connections. When energy is transmitted from the output connections to the input connections, the electronic circuit of the third converter stage performs the function of an inverter. When the third converter stage comprises the electronic circuit of the rectifier, an electronic circuit of particularly simple design is provided.

In one embodiment, the converter further comprises a first energy accumulator which is connected to the two input connections. When a voltage source is connected to the two input connections, the first energy accumulator can be supplied with charge carriers from the voltage source and thus energy can be buffer-stored in the first energy accumulator. In the event that the converter has a high energy requirement in the short term, the charge carriers which are stored by the first energy accumulator can be released thereby so that sufficient charge carriers can be provided for the short-term high energy requirement. The first energy accumulator can have at least one capacitor. The at least one capacitor can store electric charge carriers electrostatically and thus release them particularly at short notice.

In one embodiment, the converter further comprises a second energy accumulator which is connected to the two output connections. When an electrical load is connected to the two output connections, the second energy accumulator can be supplied with charge carriers from the converter and thus energy can be buffer-stored in the second energy accumulator. In the event that the electrical load has a high energy requirement in the short term, the charge carriers stored by the second energy accumulator can be released thereby so that sufficient charge carriers can be provided for the short-term high energy requirement. The second energy accumulator can have at least one capacitor. The at least one capacitor can store electric charge carriers electrostatically and thus release them particularly at short notice.

In one embodiment, the regulator unit has a first feedforward control unit which is adapted, taking into account a first detected actual value, to adapt a manipulated variable which is provided by the regulator unit in order to match the actual transformation ratio to the predetermined target transformation ratio. The manipulated variable provided by the regulator unit can also be referred to as the first manipulated variable. The first manipulated variable is provided to adapt the actual transformation ratio to the predetermined target transformation ratio. The first feedforward control unit is adapted to adapt the manipulated variable taking into account the first detected actual value. The first detected actual value may be, for example, the DC input voltage which is applied to the two input connections, the DC output voltage which is applied to the two output connections, the input current which is present at the two input connections, or the output current which is present at the two output connections. The first detected actual value is particularly preferably the output current which is present at the two output connections. The first feedforward control unit ensures that the power unit can be operated at a suitable operating point, for example depending on the load current which can be defined by the load state.

In one embodiment, the regulator unit has an adaptation unit which is adapted to adapt the predetermined target transformation ratio so that the regulator unit acts on the power unit in such a way that a second detected actual value is matched to a first predetermined target value. The adaptation unit is adapted to adapt the predetermined target transformation ratio. The predetermined target transformation ratio is adapted by the adaptation unit in such a way that the regulator unit acts on the power unit in such a way that a second detected actual value is matched to a first predetermined target value. The second detected actual value may be, for example, the DC input voltage which is applied to the two input connections, the DC output voltage which is applied to the two output connections, the input current which is present at the two input connections, or the output current which is present at the two output connections. The second detected actual value is particularly preferably the DC output voltage which is applied to the two output connections. The adaptation unit can be used to optimize the DC input voltage which is applied to the two input connections, the DC output voltage which is applied to the two output connections, the input current which is present at the two input connections, or the output current which is present at the two output connections.

In one embodiment, the regulator unit has a second feedforward control unit which is adapted, taking into account a third detected actual value, to adapt a manipulated variable which is provided by the adaptation unit in order to match the second actual value to the first predetermined target value. The manipulated variable which is provided by the adaptation unit can also be referred to as the second manipulated variable. The second manipulated variable is provided to adapt the second actual value to the first predetermined target value. The second feedforward control unit is adapted to adapt the second manipulated variable taking into account the third detected actual value. The third detected actual value may be, for example, the DC input voltage which is applied to the two input connections, the DC output voltage which is applied to the two output connections, the input current which is present at the two input connections, or the output current which is present at the two output connections. The third detected actual value is particularly preferably the input current which is present at the two input connections. The second feedforward control unit ensures that the operating point at which the power unit is operated can be optimized.

In one embodiment, the first target value is defined by a characteristic curve or by a set of characteristic curves. Due to the fact that the first target value is defined by the characteristic curve or by the set of characteristic curves, additional control and/or protection functions can be enabled.

According to a second aspect of the present disclosure, a method is provided for converting a DC input voltage into a DC output voltage using a converter according to the first aspect of the present disclosure. The method comprises the following steps: applying a DC input voltage to the two input connections of the first converter stage of the power unit, supplying a DC output voltage at the two output connections of the third converter stage of the power unit, detecting the DC input voltage and the DC output voltage or detecting the input current at the two input connections and the output current at the two output connections, and the regulator unit acting on the power unit in such a way that the actual transformation ratio is matched to the predetermined target transformation ratio. The features, technical effects and/or advantages which are described in connection with the converter according to the first aspect of the present disclosure also apply at least in an analogous manner to the method according to the second aspect of the present disclosure, and so a corresponding repetition is omitted at this point.

Further features, advantages and possible applications of the present disclosure may be found in the following description of the exemplary embodiments and in the figures. All the features described and/or depicted therein form, individually and in any combination, the subject matter of the present disclosure, irrespective of how they are combined in the individual claims or the dependency references thereof. Furthermore, in the figures, the same reference signs stand for the same or similar objects.

Figure 2:
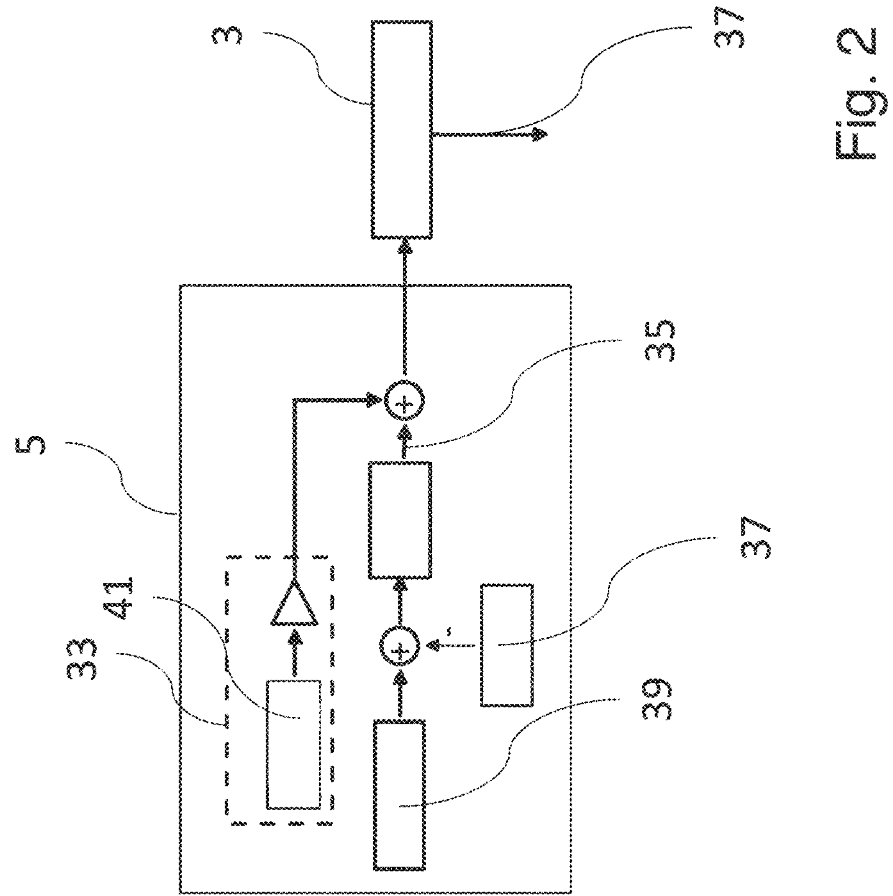
FIG. 2 shows a schematic view of a first embodiment of a regulator unit of the converter according to aspects of the present disclosure.
Figure 3:
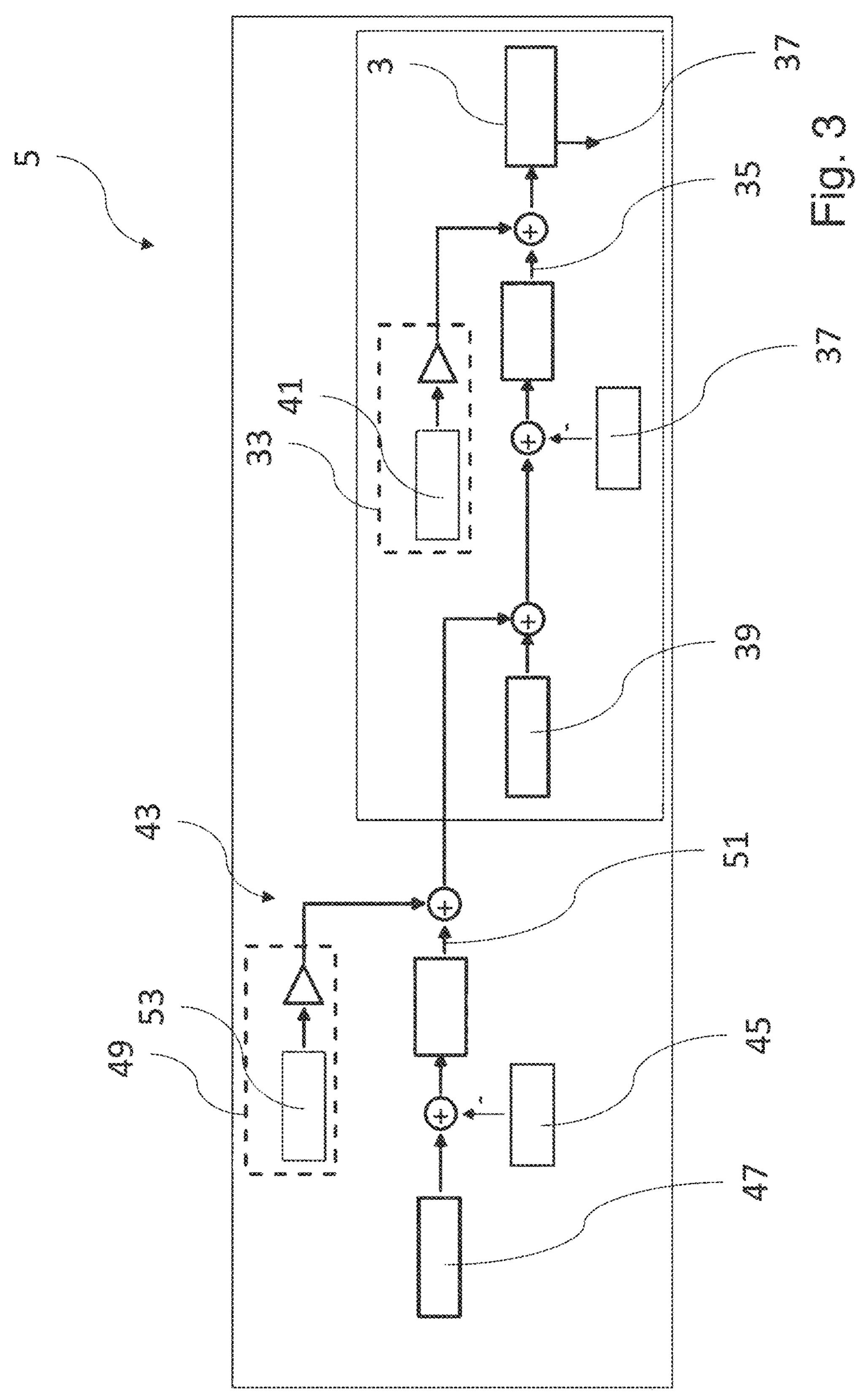
FIG. 3 shows a schematic view of a second embodiment of the regulator unit of the converter according to aspects of the present disclosure.
Figure 4:
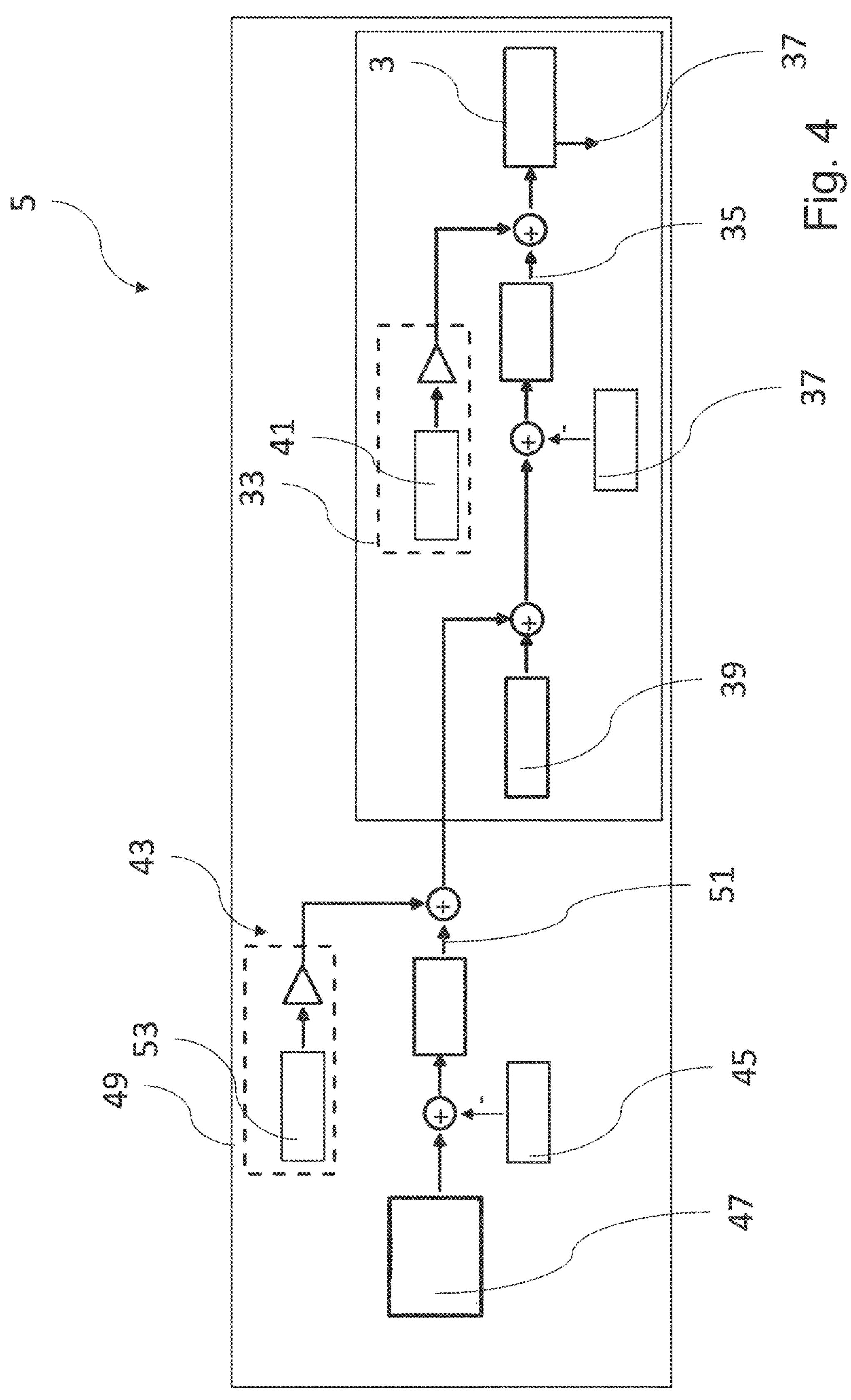
FIG. 4 shows a schematic view of a third embodiment of the regulator unit of the converter according to aspects of the present disclosure.

FIG. 1 shows a schematic view of one embodiment of a converter 1 according to the present disclosure having a power unit 3 and a regulator unit 5. FIG. 2 shows a schematic view of a first embodiment of a regulator unit 5 of the converter 1 according to the present disclosure, FIG. 3 shows a schematic view of a second embodiment of the regulator unit 5 of the converter 1 according to the present disclosure, and FIG. 4 shows a schematic view of a third embodiment of the regulator unit 5 of the converter 1 according to the present disclosure. FIGS. 2, 3 and 4 also each schematically show the power unit 3.

The converter 1 comprises the power unit 3 and the regulator unit 5 which is coupled to the power unit 3. The power unit 3 comprises a first converter stage 7, a second converter stage 9 and a third converter stage 11. The first converter stage 7 is connected to the second converter stage 9 which in turn is connected to the third converter stage 11. The first converter stage 7 comprises two input connections 13. The third converter stage 11 comprises two output connections 15. The converter 1 also comprises a first energy accumulator 17 which is connected to the two input connections 13. In addition, the converter 1 comprises a second energy accumulator 19 which is connected to the two output connections 15.

The converter 1 has a plurality of detection units. The plurality of detection units comprises first detection units 21, each of which is adapted for detecting an electrical voltage, and second detection units 23, each of which is adapted for detecting an electric current. A first detection unit 21 is connected to the two input connections 13. A further first detection unit 21 is connected to the two output connections 15. A further first detection unit 21 is connected to two output connections of the first converter stage 7, and to two input connections of the second converter stage 9. A further first detection unit 21 is connected to two output connections of the second converter stage 9, and to two input connections of the third converter stage 11. A second detection unit 23 is connected to one input connection 13 of the two input connections 13. A further second detection unit 23 is connected to one output connection 15 of the two output connections 15. A further second detection unit 23 is connected to one output connection of the two output connections of the first converter stage 7, and to one input connection of the two input connections of the second converter stage 9. A further second detection unit 23 is connected to one output connection of the two output connections of the second converter stage 9, and to one input connection of the two input connections of the third converter stage 11. The converter 1 shown in FIG. 1 can be operated, in particular, bidirectionally, that is to say independently of the load flow direction, so that the terms input connection and output connection are not to be understood restrictively and actually only form an input connection or an output connection for power transmission from left to right in FIG. 1. For energy transmission from right to left in FIG. 1, each input connection (for energy transmission from left to right in FIG. 1) forms in an analogous manner an output connection (for energy transmission from right to left in FIG. 1) and each output connection (for energy transmission from left to right in FIG. 1) forms in an analogous manner an input connection (for energy transmission from right to left in FIG. 1).

The first converter stage 7 comprises four switching elements 25. The third converter stage 11 comprises four switching elements 25. Each switching element 25 of the switching elements 25 of both the first converter stage 7 and the third converter stage 11 comprises a transistor 27, preferably an insulated-gate field-effect transistor (IGFET) or, more preferably, a metal-oxide-semiconductor field-effect transistor (MOSFET), and a diode 29. Each transistor 27 is a particularly preferably an insulated-gate bipolar transistor (IGBT). Insulated-gate bipolar transistors provide good on-state behavior, high reverse voltages, a high degree of robustness and actuation with a low power demand. The transistor 27 and the diode 29 of each switching element 25 are each connected to a first connection and to a second connection of the corresponding switching element 25, wherein the transistor 27 and the diode 29 are connected in parallel with one another between the first connection and the second connection. Each transistor 27 may be designed, for example, as an enhancement type or depletion type and have an n-channel or p-channel. Each switching element 25 of the switching elements 25 can assume an electrically conductive state and an electrically insulating state. When a switching element 25 is in the electrically conductive state, an electric current can flow through the corresponding switching element 25. When the corresponding switching element 25 is in the electrically insulating state, the electric current cannot flow through the corresponding switching element. A corresponding switching operation can be used to switch between the electrically conductive state and the electrically insulating state of each switching element 25.

The first converter stage 7 comprises an electronic circuit of an inverter. As already described, the converter 1 shown in FIG. 1 can be operated, in particular, bidirectionally, and so the term inverter is not to be understood restrictively and it actually only performs the function of an inverter for energy transmission from left to right in FIG. 1. In the case of energy transmission from right to left in FIG. 1, the electronic circuit of the first converter stage 7 performs the function of a rectifier. The switching elements 25 of the first converter stage 7 are connected to one other in such a way that they form a full-bridge arrangement. Two switching elements 25 of the first converter stage 7 are connected to a first input connection 13. A first switching element 25 of these two switching elements 25 is connected to a first output connection of the first converter stage 7, not explicitly shown in FIG. 1, and a second switching element 25 of these two switching elements 25 is connected to a second output connection of the first converter stage 7, not explicitly shown in FIG. 1. Two further switching elements 25 of the first converter stage 7 are connected to a second input connection 13. A third switching element 25 of these two switching elements 25 is connected to the first output connection of the first converter stage 7 and a fourth switching element 25 of these two switching elements 25 is connected to the second output connection of the first converter stage 7.

The third converter stage 11 comprises an electronic circuit of a rectifier. As already described, the converter 1 shown in FIG. 1 can be operated, in particular, bidirectionally, and so the term rectifier is not to be understood restrictively and it actually only performs the function of a rectifier for energy transmission from left to right in FIG. 1. In the case of energy transmission from right to left in FIG. 1, the electronic circuit of the third converter stage 11 performs the function of an inverter. The switching elements 25 of the third converter stage 11 are connected to one other in such a way that they form a full-bridge arrangement. Two switching elements 25 of the third converter stage 11 are connected to a first output connection 15. A first switching element 25 of these two switching elements 25 is connected to a first input connection of the third converter stage 11, and a second switching element 25 of these two switching elements 25 is connected to a second input connection of the third converter stage 11. Two further switching elements 25 of the third converter stage 11 are connected to a second output connection 15. A third switching element 25 of these two switching elements 25 is connected to the first input connection of the third converter stage 11 and a fourth switching element 25 of these two switching elements 25 is connected to the second input connection of the third converter stage 11.

The second converter stage 9 comprises three inductors 31, of which two inductors 31 form a transformer. The second converter stage 9 thus comprises a transformer which is designed in the present example as a mid-frequency transformer. By means of the transformer, the second converter stage 9 can provide DC isolation, in particular between the first converter stage 7 and the third converter stage 11. The two inductors 31 of the transformer have windings which are arranged in such a way that the windings are in the same direction. The transformer therefore has two windings with the same phase position. In addition to the inductor 31, which is not part of the transformer, a capacitance may be provided in series with said inductor, wherein the inductor 31 and the capacitance form a series resonant circuit. The series resonant circuit can be used to ensure that that the instantaneous value of the electric current during the transition from the electrically conductive state to the electrically insulating state of one or more switching elements 25 is particularly low so that the power loss of the one or more switching elements 25 is particularly low, with the result that the efficiency of the converter 1 may be particularly high. As an alternative to the two inductors 31 forming the transformer, the second converter stage 9 may also comprise an electronic circuit of a converter element.

The converter 1 is designed for converting a DC input voltage into a DC output voltage. The DC input voltage can be applied to the two input connections 13. The DC output voltage can be supplied to the two output connections 15. The first converter stage 7, the second converter stage 9 and the third converter stage 11 are adapted so that, when the DC input voltage is applied to the two input connections 13, the DC output voltage is supplied to the two output connections 15 during operation of the converter 1.

The first detection unit 21 which is connected to the two input connections 13 can be used to detect the DC input voltage which is applied to the two input connections 13. The second detection unit 23 which is connected to one of the two input connections 13 can be used to detect an input current which is present at the two input connections 13. In connection with the present disclosure, the fact that the input current is present at the two input connections 13 means in particular that the input current is present at least at the input connection 13 to which the second detection unit 23 is connected.

The first detection unit 21 which is connected to the two output connections 15 can be used to detect the DC output voltage which is applied to the two output connections 15. The second detection unit 23 which is connected to one of the two output connections 15 can be used to detect an output current which is present at the two output connections 15. In connection with the present disclosure, the fact that the output current is present at the two output connections 15 means in particular that the output current is present at least at the output connection 15 to which the second detection unit 23 is connected.

An essential idea of the present disclosure is that a transformation ratio is defined. The transformation ratio can be defined based on the DC input voltage which is applied to the two input connections 13 and the DC output voltage which is applied to the two output connections 15. Alternatively, the transformation ratio can be defined based on the input current which is present at the two input connections 13 and the output current which is present at the two output connections 15. Provision is made in particular for either a ratio between the DC input voltage which is applied to the two input connections 13 and the DC output voltage which is applied to the two output connections 15 or a ratio between the input current which is present at the two input connections 13 and the output current which is present at the two output connections 15 to be defined. The DC input voltage and DC output voltage which are detected by means of the first detection units 21 defines an actual transformation ratio which is provided at a point in time by the power unit 3. Alternatively, the actual transformation ratio which provided at a point in time by the power unit 3 may be defined by the input current and output current which is detected by means of the second detection units 21. In particular, the actual transformation ratio of the power unit 3 is defined by a ratio between the DC input voltage which is applied to the two input connections 13 and the DC output voltage which is applied to the two output connections 15 or by a ratio between the input current which is present at the two input connections 13 and the output current which is present at the two output connections 15. In particular, the actual transformation ratio corresponds either to the quotient of the DC input voltage (dividend) and the DC output voltage (divisor) or to the quotient of the output current (dividend) and the input current (divisor).

As already described, the regulator unit 5 is coupled to the power unit 3. In particular, the regulator unit 5 is connected to the switching elements 25 in order to actuate the switching elements 25. In particular, the regulator unit 5 can provide a corresponding control signal for each switching element 25 so that each switching element 25 of the switching elements 25 can pass both from a corresponding electrically conductive state to a corresponding electrically insulating state as well as from the corresponding electrically insulating state to the corresponding electrically conductive state depending on the corresponding control signal. The regulator unit 5 can act on the power unit 3 by actuating the switching elements 25. Furthermore, the regulator unit 5 is connected in particular to the first detection units 21 and to the second detection units 23. The regulator unit 5 can receive a corresponding detection signal from each first detection unit 21 of the first detection units 21, said detection signal corresponding to an actual value of an applied electrical voltage. Furthermore, the regulator unit 5 can receive a corresponding detection signal from each second detection unit 23 of the second detection units 23, said detection signal corresponding to an actual value of a present electric current. The regulator unit 5 can therefore determine the actual transformation ratio using detection signals. The transformation ratio that is to be targeted by the actual transformation ratio is referred to as the target transformation ratio. The target transformation ratio may be constant over time, in particular during a specified period of time, or it may be variable over time, in particular during a specified period of time. The regulator unit 5 is adapted to act on the power unit 3 in such a way that the actual transformation ratio is matched to a predetermined target transformation ratio.

Provision is made in particular for the actual transformation ratio to be matched to the predetermined target transformation ratio for certain ranges of electrical voltages and/or for certain ranges of electric currents. For example, it is possible to define a minimum electrical voltage and a maximum electrical voltage for the first converter stage 7, with the DC input voltage having to be between these, so that the regulator unit 5 acts on the power unit 3 in such a way that the actual transformation ratio is matched to the predetermined target transformation ratio. Furthermore, for example, it is possible to define a minimum electric current and a maximum electric current for the first converter stage 7, with the input current having to be between these, 3 so that the regulator unit 5 acts on the power unit 3 in such a way that the actual transformation ratio is matched to the predetermined target transformation ratio. In addition, for example, it is possible to define a minimum electrical voltage and a maximum electrical voltage for the third converter stage 11, with the DC output voltage having to be between these, so that the regulator unit 5 acts on the power unit 3 in such a way that the actual transformation ratio is matched to the predetermined target transformation ratio. For example, it is also possible to define a minimum electric current and a maximum electric current for the third converter stage 11, with the output current having to be between these, 3 so that the regulator unit 5 acts on the power unit 3 in such a way that the actual transformation ratio is matched to the predetermined target transformation ratio. The fact that the actual transformation ratio is matched to the predetermined target transformation ratio for certain ranges of electrical voltages and/or certain ranges of electric currents makes it possible to ensure that the converter 1 can be operated reliably.

As already described, FIG. 2 shows a schematic view of a first embodiment of the regulator unit 5 of the converter 1 according to the present disclosure, FIG. 3 shows a schematic view of the second embodiment of the regulator unit 5 of the converter 1 according to the present disclosure, and FIG. 4 shows a schematic view of the third embodiment of the regulator unit 5 of the converter 1 according to the present disclosure.

The first embodiment of the regulator unit 5 in FIG. 2 comprises a first feedforward control unit 33. The first feedforward control unit 33 is adapted to adapt a manipulated variable 35 which is provided by the regulator unit 5 and which can also be referred to as the first manipulated variable. The manipulated variable 35 is provided to adapt the actual transformation ratio, which is denoted in FIGS. 2, 3 and 4 by the reference numeral 37, to the predetermined target transformation ratio, which is denoted in FIGS. 2, 3 and 4 by the reference numeral 39. The first feedforward control unit 33 is adapted to adapt the manipulated variable 35 taking into account a first detected actual value 41. The first detected actual value 41 may be, for example, the DC input voltage which is applied to the two input connections 13, the DC output voltage which is applied to the two output connections 15, the input current which is present at the two input connections 13, or the output current which is present at the two output connections 15. The first detected actual value 41 is particularly preferably the output current which is present at the two output connections 15. The first feedforward control unit 33 ensures that the power unit 3 can be operated at a suitable operating point, for example depending on the load current which can be defined by the load state.

The second embodiment of the regulator unit 5 in FIG. 3 additionally comprises an adaptation unit 43. The adaptation unit 43 is adapted to adapt the predetermined target transformation ratio 39. The predetermined target transformation ratio 39 is adapted by the adaptation unit 43 in such a way that the regulator unit 5 acts on the power unit 3 in such a way that a second detected actual value 45 is matched to a first predetermined target value 47. The adaptation unit 43 is therefore adapted to adapt the predetermined target transformation ratio so that the regulator unit 5 acts on the power unit 3 in such a way that the second detected actual value 45 is matched to the first predetermined target value 47. The second detected actual value 45 may be, for example, the DC input voltage which is applied to the two input connections 13, the DC output voltage which is applied to the two output connections 15, the input current which is present at the two input connections 13, or the output current which is present at the two output connections 15. The second detected actual value 45 is particularly preferably the DC output voltage which is applied to the two output connections 15. The adaptation unit 43 can be used to optimize the DC input voltage which is applied to the two input connections 13, the DC output voltage which is applied to the two output connections 15, the input current which is present at the two input connections 13, or the output current which is present at the two output connections 15.

In addition, the second embodiment of the regulator unit 5 in FIG. 3 also comprises a second feedforward control unit 49. The second feedforward control unit 49 is adapted to adapt a manipulated variable 51 which is provided by the adaptation unit 43 and which can also be referred to as the second manipulated variable. The manipulated variable 51 is provided to adapt the second actual value 45 to the first predetermined target value 47. The second feedforward control unit 49 is adapted to adapt the manipulated variable 51 taking into account a third detected actual value 53. The third detected actual value 53 may be, for example, the DC input voltage which is applied to the two input connections 13, the DC output voltage which is applied to the two output connections 15, the input current which is present at the two input connections 13, or the output current which is present at the two output connections 15. The third detected actual value 53 is particularly preferably the input current which is present at the two input connections. The second feedforward control unit 49 ensures that the operating point at which the power unit 3 is operated can be optimized further.

The third embodiment of the regulator unit 5 of the converter 1 according to the present disclosure, shown schematically in FIG. 4, essentially corresponds to the second embodiment of the regulator unit 5 shown schematically in FIG. 3, wherein, in the second embodiment, the first predetermined target value 47 is a predetermined constant value and, in the third embodiment, the first predetermined target value 47 is defined by a characteristic curve or by a set of characteristic curves. When the first predetermined target value 47 is a predetermined constant value, a solution which has a particularly low computation intensity is provided. When the first predetermined target value 47 is defined by a characteristic curve or by a set of characteristic curves, protection functions can be provided, for example, in particular when a balance is provided between the characteristic curve or the set of characteristic curves and the DC input voltage which is applied to the two input connections 13, the DC output voltage which is applied to the two output connections 15, the input current which is present at the two input connections 13, and/or the output current which is present at the two output connections 15.

The converter 1 according to the present disclosure can be used to carry out a method in which a DC input voltage is converted into a DC output voltage. As already described in the description of the functionality of the converter 1 according to the present disclosure, at least in an analogous manner, the method can comprise the following steps: Applying a DC input voltage to the two input connections 13 of the first converter stage 7 of the power unit 3. Supplying a DC output voltage at the two output connections 15 of the third converter stage 11 of the power unit 3. Detecting the DC input voltage and the DC output voltage or detecting the input current at the two input connections 13 and the output current at the two output connections 15. The regulator unit 5 acting on the power unit 3 in such a way that the actual transformation ratio is matched to the predetermined target transformation ratio.

In addition, it should be pointed out that "having" does not exclude any other elements or steps and "a" or "an" does not exclude a plurality. Furthermore, it should be pointed out that features that have been described with reference to one of the above exemplary embodiments may also be used in combination with other features of other exemplary embodiments described above. Reference signs in the claims should not be construed as a limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

- 1 Converter
- 3 Power unit
- 5 Regulator unit
- 7 First converter stage
- 9 Second converter stage
- 11 Third converter stage
- 13 Input connection
- 15 Output connection
- 17 First energy accumulator
- 19 Second energy accumulator
- 21 First detection unit
- 23 Second detection unit
- 25 Switching element
- 27 Transistor
- 29 Diode
- 31 Inductor
- 33 First feedforward control unit
- 35 First manipulated variable
- 37 Actual transformation ratio
- 39 Target transformation ratio
- 41 First detected actual value
- 43 Adaptation unit
- 45 Second detected actual value
- 47 First predetermined target value
- 49 Second feedforward control unit
- 51 Second manipulated variable
- 53 Third detected actual value

The invention claimed is:

1. A converter for converting a DC input voltage into a DC output voltage, the converter comprising:
- a power unit, the power unit comprising:
  - a first converter stage comprising two input connections;
  - a second converter stage, which is connected to the first converter stage; and a third converter stage, which is connected to the second converter stage and has two output connections, wherein the first converter stage, the second converter stage, and the third converter stage are adapted so that, when the DC input voltage is applied to the two input connections, the DC output voltage is supplied at the two output connections during operation of the converter, and wherein an actual transformation ratio of the power unit is defined:

by a ratio between the DC input voltage, which is applied to the two input connections, and the DC output voltage, which is applied to the two output connections, or by a ratio between an input current, which is present at the two input connections, and an output current, which is present at the two output connections; and a regulator unit, which is coupled to the power unit, wherein the regulator unit is adapted to act on the power unit in such a way that the actual transformation ratio is matched to a predetermined target transformation ratio, and wherein the regulator unit comprises a first feedforward control unit which is adapted, taking into account a first detected actual value, to adapt a manipulated variable which is provided by the regulator unit in order to match the actual transformation ratio to the predetermined target transformation ratio.

2. The converter as claimed in claim 1, wherein the predetermined target transformation ratio is constant over time.

3. The converter as claimed in claim 1, wherein the predetermined target transformation ratio is variable over time.

4. The converter as claimed in claim 1, wherein the first converter stage comprises an electronic circuit of an inverter.

5. The converter as claimed in claim 1, wherein the second converter stage is adapted to provide DC isolation.

6. The converter as claimed in claim 5, wherein the second converter stage comprises a transformer.

7. The converter as claimed in claim 1, wherein the second converter stage comprises an electronic circuit of a converter element.

8. The converter as claimed in claim 1, wherein the third converter stage comprises an electronic circuit of a rectifier.

9. The converter as claimed in claim 1, further comprising a first energy accumulator which is connected to the two input connections.

10. The converter as claimed in claim 1, further comprising a second energy accumulator which is connected to the two output connections.

11. The converter as claimed in claim 1, wherein the regulator unit comprises an adaptation unit which is adapted to adapt the predetermined target transformation ratio so that the regulator unit acts on the power unit in such a way that a second detected actual value is matched to a first predetermined target value.

12. The converter as claimed in claim 11, wherein the regulator unit comprises a second feedforward control unit which is adapted, taking into account a third detected actual value, to adapt a manipulated variable which is provided by the adaptation unit in order to match the second actual value to the first predetermined target value.

13. The converter as claimed in claim 11, wherein the first predetermined target value is defined by a characteristic curve or by a set of characteristic curves.

14. A method for converting a DC input voltage into a DC output voltage using the converter as claimed in claim 1, wherein the method comprises the following steps:

applying a DC input voltage to the two input connections of the first converter stage of the power unit, supplying a DC output voltage at the two output connections of the third converter stage of the power unit, detecting the DC input voltage and DC output voltage, or detecting the input current at the two input connections and the output current at the two output connections, and the regulator unit acting on the power unit in such a way that the actual transformation ratio is matched to the predetermined target transformation ratio.

15. The converter as claimed in claim 1, wherein the first detected actual value is a value of the DC input voltage, the DC output voltage, the input current, or the output current.

16. The converter as claimed in claim 15, wherein the regulator unit comprises an adaptation unit which is adapted to adapt the predetermined target transformation ratio so that the regulator unit acts on the power unit in such a way that a second detected actual value is matched to a first predetermined target value, wherein the regulator unit comprises a second feedforward control unit which is adapted, taking into account a third detected actual value, to adapt a manipulated variable which is provided by the adaptation unit in order to match the second actual value to the first predetermined target value, wherein the second detected actual value is the value of the DC input voltage, the DC output voltage, the input current, or the output current, wherein third detected actual value is the value of the DC input voltage, the DC output voltage, the input current, or the output current, and wherein the first predetermined target value is a target value for the DC input voltage, the DC output voltage, the input current, or the output current.

17. The converter as claimed in claim 16, wherein the first detected actual value is the value of the output current, wherein the second detected actual value is the value of the DC output voltage, wherein the third detected actual value is the value of the input current, and wherein the first predetermined target value corresponds to a first predetermined target value for the DC input voltage.

* * * * *